(12) United States Patent
Mitome

(10) Patent No.: US 8,347,406 B2
(45) Date of Patent: Jan. 1, 2013

(54) IMAGE PROCESSING APPARATUS, IMAGE PROCESSING METHOD, AND STORAGE MEDIUM

(75) Inventor: Aya Mitome, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 786 days.

(21) Appl. No.: 12/358,118

(22) Filed: Jan. 22, 2009

(65) Prior Publication Data

US 2009/0193525 A1 Jul. 30, 2009

(30) Foreign Application Priority Data

Jan. 25, 2008 (JP) .................... 2008-015502

(51) Int. Cl.
*H04L 9/32* (2006.01)

(52) U.S. Cl. .............. 726/30; 729/2; 729/7; 729/25; 729/26; 729/29; 729/30; 713/183

(58) Field of Classification Search .......... 726/30
See application file for complete search history.

(56) References Cited

U.S. PATENT DOCUMENTS

| 5,319,181 | A  | * | 6/1994  | Shellhammer et al. .. 235/462.09 |
| 7,062,189 | B2 | * | 6/2006  | Hirano ............... 399/80 |
| 7,149,000 | B1 | * | 12/2006 | Sakai et al. ............ 358/3.28 |
| 7,532,836 | B2 | * | 5/2009  | Kawabuchi et al. ........ 399/80 |
| 2003/0179399 | A1 | * | 9/2003 | Matsunoshita ........... 358/1.13 |
| 2005/0123316 | A1 | * | 6/2005 | Hirano ................ 399/80 |
| 2005/0141010 | A1 | * | 6/2005 | Kanai ................ 358/1.14 |
| 2005/0174596 | A1 | * | 8/2005 | Uchida et al. ........... 358/1.14 |
| 2006/0053137 | A1 | * | 3/2006 | Tanimoto .............. 707/101 |
| 2006/0256369 | A1 | * | 11/2006 | Mitamura ............. 358/1.15 |
| 2007/0192876 | A1 | * | 8/2007 | Takeuchi .............. 726/29 |
| 2007/0223955 | A1 | * | 9/2007 | Kawabuchi et al. ........ 399/80 |
| 2008/0007759 | A1 | * | 1/2008 | Furuyama et al. ......... 358/1.14 |
| 2008/0130053 | A1 | * | 6/2008 | Okamoto ............. 358/1.17 |

FOREIGN PATENT DOCUMENTS

| JP | 10-312447 A    | 11/1998 |
| JP | 2003-280469 A  | 9/2003  |
| JP | 2007-195005 A  | 8/2007  |
| JP | 2008-011149 A  | 1/2008  |

* cited by examiner

*Primary Examiner* — Kambiz Zand
*Assistant Examiner* — Yonas Bayou
(74) *Attorney, Agent, or Firm* — Canon U.S.A., Inc., IP Division

(57) ABSTRACT

An image processing apparatus includes a generation unit configured to scan a document and generate an original image, a decoding unit configured to decode a two-dimensional code on the original image generated in the generation unit to obtain original information, and a determination unit configured to determine whether the original information obtained in the decoding unit contains a password. The image processing apparatus also includes a conversion unit configured to convert the original image generated by the generation unit into an electronic file attaching the password if the determination unit determines that the original information contains the password, and convert the original image generated by the generation unit into an electronic file without attaching the password if the determination unit determines that the original information does not contain the password, and a sending unit configured to send the electronic file obtained by the conversion in the conversion unit.

3 Claims, 7 Drawing Sheets

FIG.6

EXAMPLE OF ORIGINAL INFORMATION

SCAN: PERMIT WITH CONDITIONS (PERMIT IF PASSWORD IS CORRECT)

PASSWORD: abcdefg

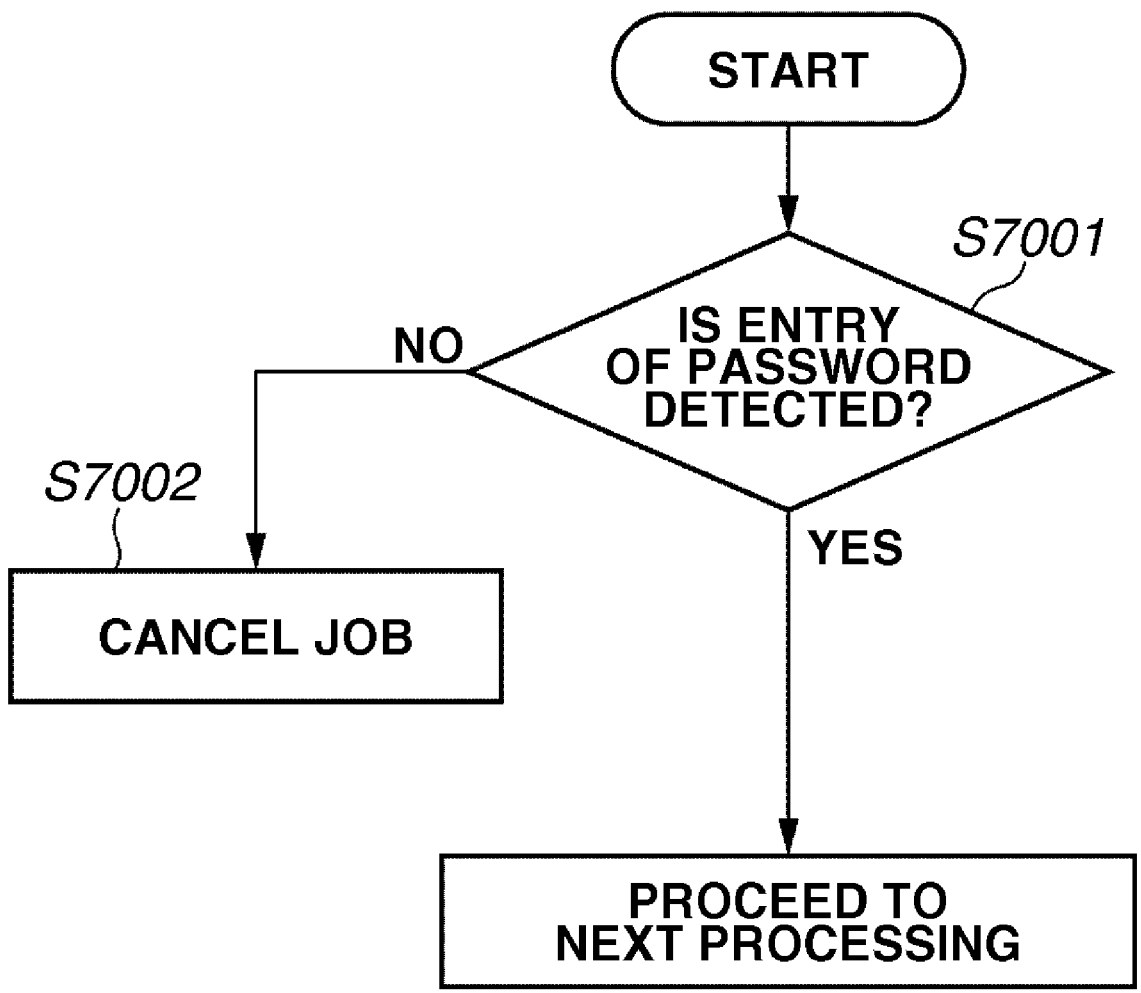

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium with computer-executable instructions for processing a document containing authentication information.

2. Description of the Related Art

Japanese Patent Application Laid-Open No. 10-312447 discusses the QR CODE (registered trademark) that is a kind of two-dimensional code that can record a large amount of data in a tiny space.

Japanese Patent Application Laid-Open No. 2003-280469 discusses the GLYPH (registered trademark) code that can control a copying operation.

Using the technologies discussed in Japanese Patent Application Laid-Open No. 10-312447 or Japanese Patent Application Laid-Open No. 2003-280469, paper media such as a card or a document can contain information used for performing electronic control. Accordingly, an access control on the paper media can be realized.

When the technology discussed in the QR CODE® or the GLYPH® is applied to a multifunction peripheral (MFP), the MFP detects a two-dimensional code on a document by scanning, and decodes the two-dimensional code to obtain authentication information of the document. Based on the authentication result, the MFP can perform control for continuing the processing onto the document or stopping the processing.

When the MFP determines that it is possible to continue the processing, by using a send function provided in the MFP, the MFP can convert the document into electronic data and send the data to a file server or a personal computer (PC).

In such a case, authentication information contained in the document is stored as an image of two-dimensional code in the electronic data generated by the MFP.

In consequence, it is not possible to perform an authentication control of the electronic data in the file server or the PC that is the destination of the transmission by the MFP. As a result, even if the document has the authentication information, there is a risk that the document can be freely viewed or copied.

Further, if the authentication control is also performed on the electronic data according to the above-described flow, it may be necessary to analyze the image again.

SUMMARY OF THE INVENTION

According to an aspect of the present invention, an image processing apparatus is provided that includes a generation unit configured to scan a document and generate an original image, a decoding unit configured to decode a two-dimensional code on the original image generated by the generation unit to obtain original information, and a determination unit configured to determine whether the original information obtained in the decoding unit contains a password. The image processing apparatus also includes a conversion unit configured to convert the original image generated in the generation unit into an electronic file attaching the password if the determination unit determines that the original information contains the password, and convert the original image generated by the generation unit into an electronic file without attaching the password if the determination unit determines that the original information does not contain the password, and a sending unit configured to send the electronic file obtained by the conversion in the conversion unit.

According to another aspect of the invention, an image processing apparatus is provided that includes a generation unit configured to scan a document and generate an original image, a decoding unit configured to decode a two-dimensional code on the original image generated by the generation unit to obtain original information, and a determination unit configured to determine whether the original information obtained in the decoding unit requires a password as a condition to permit printing of to print the original image. The image processing apparatus also has a display unit configured to display a request to enter the password if the determination unit determines that the password is required, a conversion unit configured to convert the original image generated by the generation unit into an electronic file without the password if entry of the password is executed in response to the request to enter the password, and convert the original image generated by the generation unit into an electronic file with the password if entry of the password is not executed in response to the request to enter the password, and a sending unit configured to send the electronic file obtained by the conversion in the conversion unit.

Further embodiments, aspects and features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate numerous exemplary embodiments, features and aspects of the invention and, together with the description, serve to explain principles of the invention.

FIG. 6 illustrates an example of decoding and coding.

FIG. 7 illustrates a flowchart of an example of processing for password entry detection.

DETAILED DESCRIPTION OF THE EMBODIMENTS

Various exemplary embodiments, features and aspects of the present invention will now be herein described in detail below with reference to the drawings.

Figure 1:
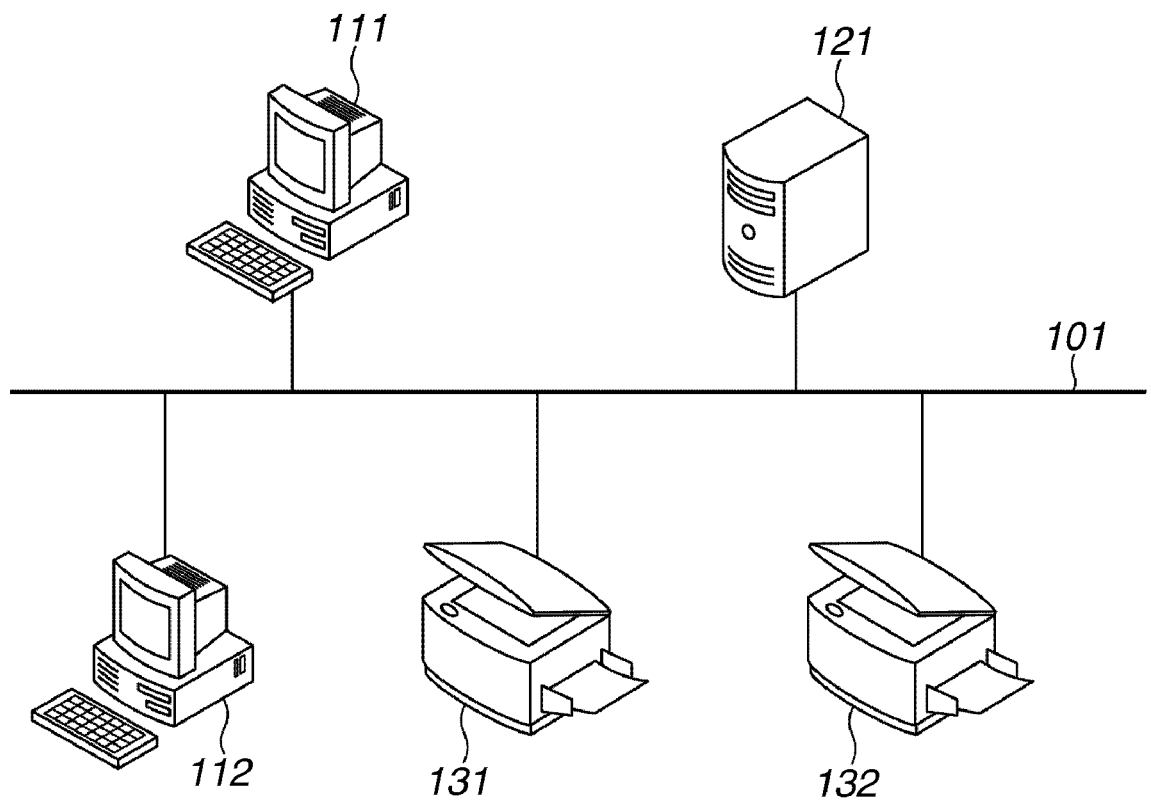
FIG. 1 illustrates a configuration of a system according to a first exemplary embodiment of the present invention.

FIG. 1 illustrates a configuration of a system according to a first exemplary embodiment of the present invention. The system according to the first exemplary embodiment includes, at least one MFP 131 and a client computer 111.

The MFP 131 may have functions to scan, print, copy, and send. The other functions of the MFP 131 will be described in detail in the following descriptions of exemplary embodiments of the present invention.

In the embodiment as shown, the client computer 111 can receive data sent by the MFP 131 via a network 101 and store the received data. Further, the client computer 111 can display the stored data. The other functions of the client computer 111 will be described in detail in the following descriptions of the exemplary embodiments of the present invention.

In the exemplary embodiments described below, as illustrated in FIG. 1, a plurality of client computers 111 and 112, a plurality of MFPs 131 and 132, and a file server 121 can be connected to the network 101.

Next, an example of a processing flow (FIG. 2) according to the first exemplary embodiment is described.

The MFPs 111 and 112 in FIG. 1 first receive a user's selection of functions such as "send mode" or "print mode" displayed on operation screens, and receive a user's selection of a start button displayed on the operation screens of the MFPs 111 and 112.

Figure 2:
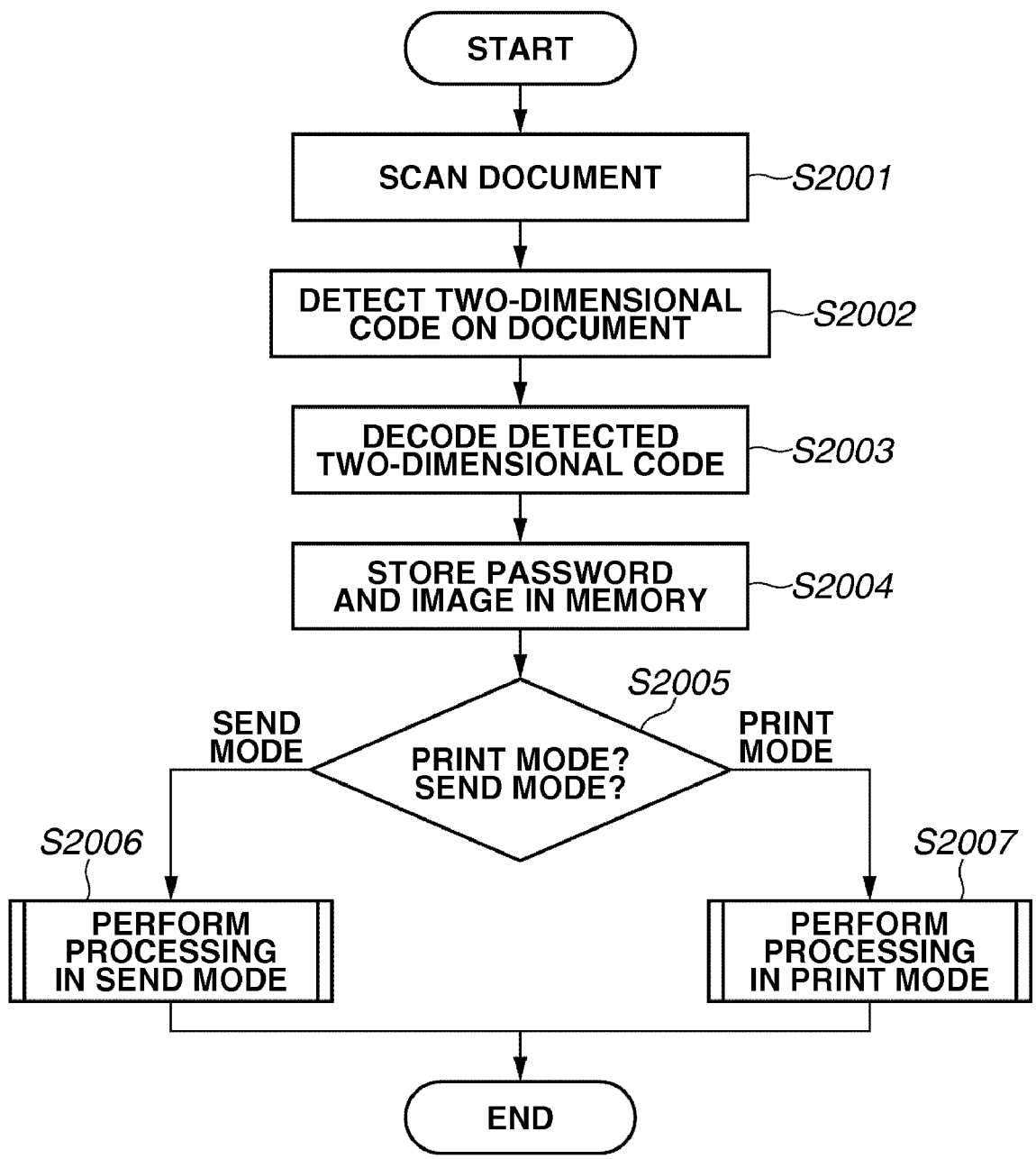
FIG. 2 illustrates a flowchart of an example of processing according to the first exemplary embodiment of the present invention.

FIG. 2 illustrates a flowchart of the processing example that starts in response to the reception of the user's selection of the start button displayed on the operation screen of the MFP. The overall processing in the individual steps in the flowchart illustrated in FIG. 2 is controlled by a central processing unit (CPU) in the MFP.

In step S2001, the MFP scans a document on a document positioning plate and generates an original image as an electric signal.

In step S2002, the MFP detects an area where a two-dimensional code exists in the original image.

Then, in step S2003, the MFP decodes the two-dimensional code detected in step S2002, and the processing proceeds to step S2004.

In a case where the two-dimensional code is not detected or decoded in step S2002 or step S2003, the MFP displays an appropriate error indication on the operation screen.

Definitions of the terms "decoding" and "coding" in the exemplary embodiment are described with reference to FIG. 6. FIG. 6 illustrates information (e.g., original information) contained in a two-dimensional code. By coding the original information as an image, the two-dimensional code is generated.

For example, the two-dimensional code is generated by coding the original information "SCAN: PERMIT WITH CONDITIONS (PERMIT IF PASSWORD IS CORRECT), PASSWORD: abcdefg" as an image.

In the exemplary embodiment of the present invention, "coding" is defined as "coding an original information as an image and generating a two-dimensional code". While, in the exemplary embodiment, "decoding" is defined as "obtaining the original information from the two-dimensional code". These are meanings of the terms "decoding" and "coding" defined according to the exemplary embodiment.

In step S2004, the MFP stores the bit-mapped original image generated in step S2001, the original information obtained in step S2003, and the existing area of the two-dimensional code detected in step S2002. In the processing, the MFP stores the original image generated in step S2001 according to a bit map method into the memory.

In step S2005, the MFP determines whether a selection of the "send mode" has been received or the "print mode" has been received before a selection of a start button is received.

In step S2005, if it is determined that the selection of the "print mode" has been received (PRINT MODE in step S2005), the processing proceeds to step S2007. An example of processing performed by the MFP in step S2007 is illustrated in FIG. 3.

Figure 3:
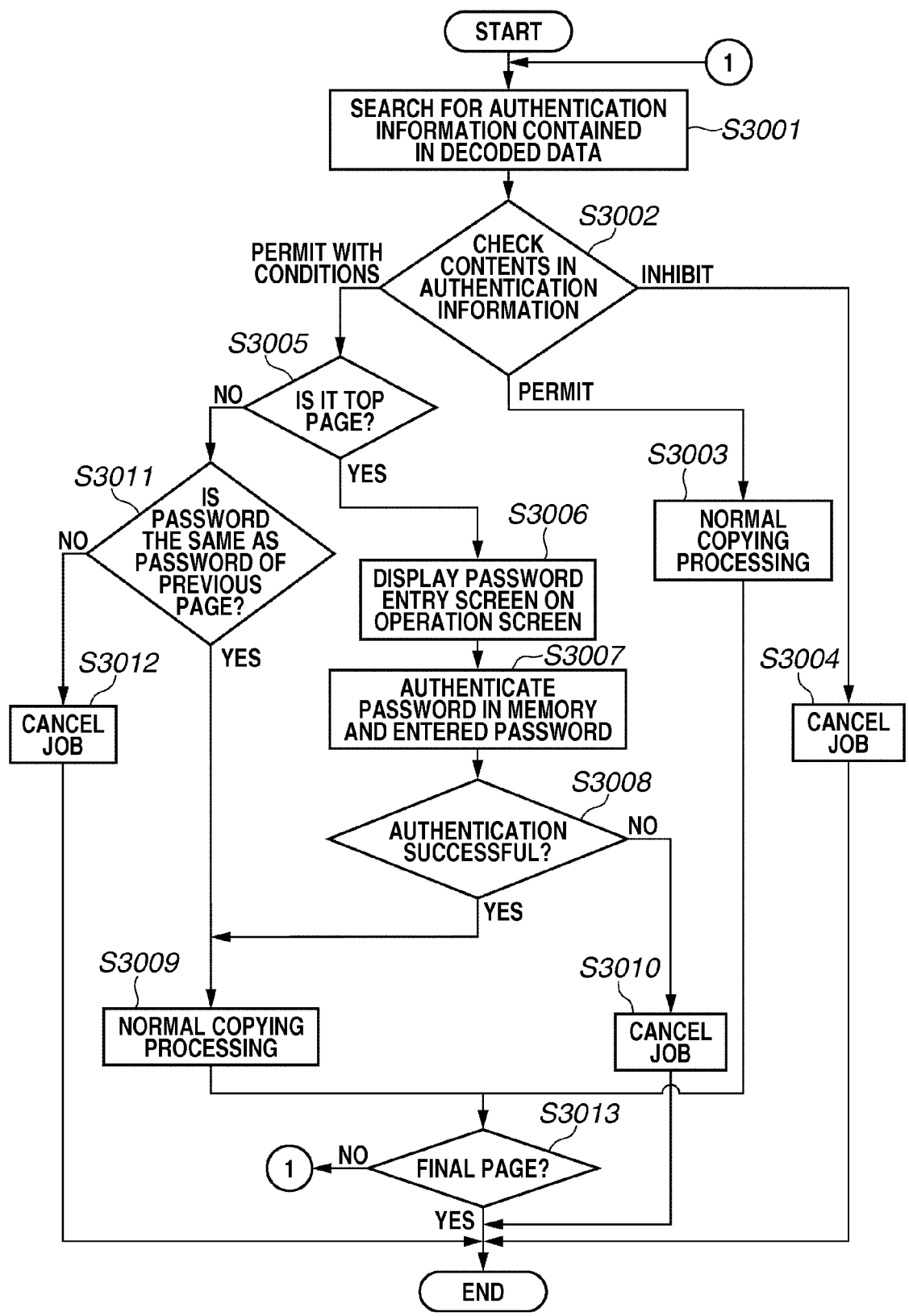
FIG. 3 illustrates a flowchart of an example of processing according to the first exemplary embodiment of the present invention.

In step S3001 in FIG. 3, the MFP searches for authentication information for operation restriction in the information stored in the memory in step S2004, and the processing proceeds to step S3002.

In the description, the authentication information for operation restriction is described with three examples of "permit", "inhibit", and "permit with condition by a password entry". However, in the authentication information for operation restriction, information other than the three examples of "permit", "inhibit", and "permit with condition by a password entry" may also be contained.

In step S3002, if the MFP determines the authentication information as "permit" (PERMIT in step S3002), the processing proceeds to step S3003.

In step S3003, the MFP performs a normal copying processing. Processing then proceeds to step S3013.

In step S3002, if the MFP determines the authentication information as "inhibit" (INHIBIT in step S3002), the processing proceeds to step S3004.

In step S3004, the MFP cancels the job, and processing is ended.

In step S3002, if the MFP determines the authentication information as "permit with condition by a password entry" (PERMIT WITH CONDITIONS in step S3002), the processing proceeds to step S3005.

In step S3005, the MFP determines whether it is a top page of the job. In step S3005, if the MFP determined that it is a top page (YES in step S3005), the processing proceeds to step S3006.

In step S3006, the MFP displays a password entry request screen on the operation screen to prompt the user to enter a password.

In step S3006, an example of a processing as illustrated in FIG. 7 may be implemented. More specifically, in step S7001, the MFP determines whether an entry of a password is detected.

In step S7001, if the entry of the password is not detected (NO in step S7001), in step S7002, the MFP cancels the job.

On the other hand, if the entry of the password is detected (YES in step S7001), the processing proceeds to step S3007.

In step S3007, the MFP performs an authentication by comparing the password information stored in the memory in step S2004 with the password entered in step S3006, and the processing proceeds to step S3008.

In step S3008, if the MFP determines that the authentication is successful (YES in step S3008), the processing proceeds to step S3009 and the MFP performs normal copying processing.

In step S3008, if the MFP determines that the authentication is not successful (NO in step S3008), the processing proceeds to step S3010 where the MFP cancels the job and processing is ended.

In step S3005, if the MFP determines that it is not a top page (NO in step S3005), the processing proceeds to step S3011.

In step S3011, the MFP determines whether the password stored in the memory in step S2004 is the same as a password of a previous page of the job. In step S3011, if the MFP determines that the passwords are the same (YES in step S3011), the processing proceeds to step S3009 and the MFP performs normal copying processing. Processing then proceeds to step S3013.

In step S3011, if the MFP determines that the password is not the same as the password of the previous page of the job (NO in step S3011), the processing proceeds to step S3012 where the MFP cancels the job, and processing is ended.

Then, the MFP repeats the processing from step S3001 to S3012 until all pages in the job are processed. More specifically, in step S3013, the MFP determines whether it is processing a final page. Then, in step S3013, if the MFP determines that it is not the processing of the final page (NO in step S3013), the processing returns to step S3001. On the other hand, if the MFP determines that it is the processing of the final page (YES in step S3013), the processing ends.

Figure 4:
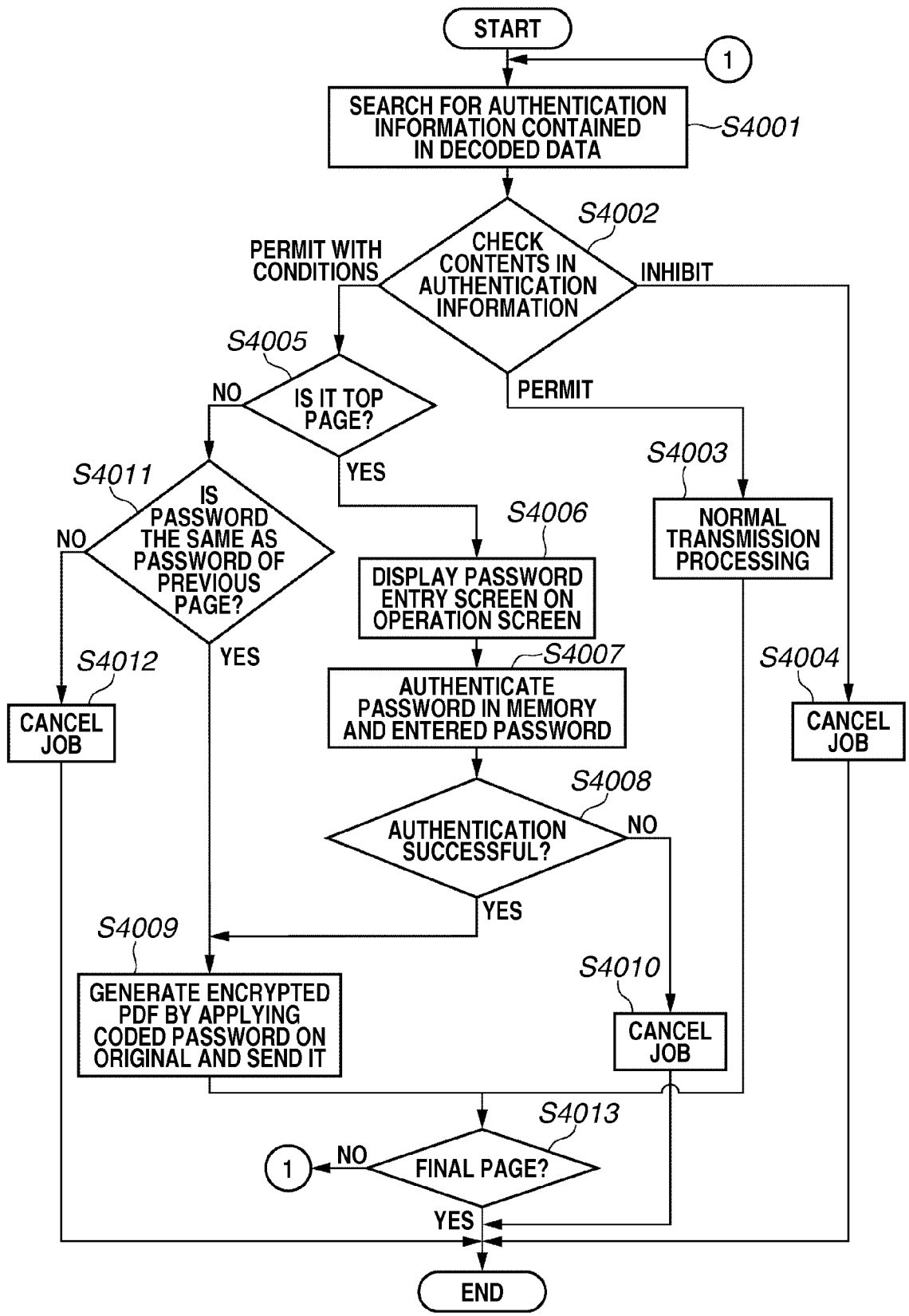
FIG. 4 illustrates a flowchart of an example of processing according to the first exemplary embodiment of the present invention.

In step S2005, if the MFP determines that the selection of "send mode" has been received (SEND MODE in step S2005), the processing proceeds to step S2006. An example of processing performed by the MFP in step S2006 is illustrated in FIG. 4.

In step S4001, the MFP searches the information stored in the memory in step S2004 for authentication information for operation restriction, and the processing proceeds to step S4002.

In the description, the authentication information for operation restriction is described with three examples of "permit", "inhibit", and "permit with condition by a password entry". In the authentication information for operation restriction, information other than the three examples of "permit", "inhibit", and "permit with condition by a password entry" may also be contained.

In step S4002, if the MFP determines the authentication information as "permit" (PERMIT in step S4002), the processing proceeds to step S4003.

In step S4003, the MFP performs normal send processing. Processing then proceeds to step S4013.

In step S4002, if the MFP determines the authentication information as "inhibit" (INHIBIT in step S4002), the processing proceeds to step S4004.

In step S4004, the MFP cancels the job, and processing is ended.

In step S4002, if the MFP determines the authentication information as "permit with condition by password entry" (PERMIT WITH CONDITIONS in step S4002), the processing proceeds to step S4005.

In step S4005, the MFP determines whether it is a top page of the job. In step S4005, if the MFP determines that it is the top page (YES in step S4005), the processing proceeds to step S4006.

In step S4006, the MFP displays a password entry request screen on the operation screen to prompt the user to enter a password.

In step S4007, an example of processing as illustrated in FIG. 7 may be implemented. More specifically, in step S7001, the MFP determines whether an entry of a password is detected.

In step S7001, if the entry of the password is not detected (NO in step S7001), in step S7002, the MFP cancels the job.

On the other hand, if the entry of the password is detected (YES in step S7001), the processing proceeds to step S4007.

In step S4007, the MFP performs an authentication by comparing the password information stored in the memory in step S2004 with the password entered in step S4006, and the processing proceeds to step S4008.

In step S4008, if the MFP determines that the authentication is successful (YES in step S4008), the processing proceeds to step S4009.

In step S4009, the MFP generates an encrypted Portable Document Format (PDF) of the bit-mapped original image that was stored in the memory in step S2004, using the password also stored in the memory.

Here, the meaning of "generating an encrypted PDF using the bit-mapped original image and the password" is described in detail. In the exemplary embodiment, the encrypted PDF is one type of PDF file. The "generating an encrypted PDF using the bit-mapped original image and the password" means as follows: the bit-mapped original image is converted into the image of the PDF format and a PDF file is generated; then, in order to limit access to the original image of the PDF format, the password is added to the PDF file. By adding the password, the encrypted PDF is generated. In a case where a request to access the encrypted PDF is issued by the user on a transmission destination device (for example, a PC), and if the added password matches a password input by the user on the destination device, the original image of the PDF format is displayed. On the other hand, if the passwords do not match with each other, the original image of the PDF format is not displayed. The MFP sends the generated encrypted PDF to the destination device set in the "send mode".

In the exemplary embodiment, as an example of the electronic file that records the electronic data generated from the original image read into the MFP, the PDF file is described. However, it is not limited to the PDF file. For example, if it is possible to encrypt, any electronic file can be employed in the exemplary embodiments of the present invention.

In step S4008, if the MFP determines that the authentication is not successful (NO in step S4008), the processing proceeds to step S4010.

In step S4010, the MFP cancels the job, and processing is ended.

In step S4005, if the MFP determines that it is not a top page (NO in step S4005), the processing proceeds to step S4011.

In step S4011, the MFP determines whether the password stored in the memory in step S2004 is the same as a password of a previous page of the job. In step S4011, if the MFP determines that the passwords are the same (YES in step S4011), the processing proceeds to step S4009. In step S4009, the MFP generates an encrypted PDF of the bit-mapped original image that was stored in the memory in step S2004, using the password also stored in the memory and sends the encrypted PDF to a destination device set in the "send mode". In the exemplary embodiment, the electronic file such as an encrypted PDF was generated using the password. However, as a different exemplary embodiment, it is assumed that the electronic file was generated using a different password. In the different exemplary embodiment, entry of the different password is also requested in s4006 and the different password is entered. In addition, in s4009, the electronic file was generated using the different word. This different exemplary embodiment also protects the electronic file by a password although it is a bit burden for the user to enter two passwords.

In step S4011, if the MFP determines that the password is not the same as the password of the previous page of the job (NO in step S4011), the processing proceeds to step S4012.

In step S4012, the MFP cancels the job, and processing is ended.

Then, the MFP repeats the processing from step S4001 to S4012 until all pages in the job are processed. More specifically, in step S4013, the MFP determines whether it is processing a final page. Then, in step S4013, if the MFP determines that it is not processing of the final page (NO in step S4013), the processing returns to step S4001. On the other hand, if the MFP determines that it is the processing of the final page (YES in step S4013), the processing ends.

By performing the above-described processing, even if a document having embedded authentication information therein is scanned, electronic data is generated, and the electronic data is sent to a file server or a PC, the authentication information can still be applied. Furthermore, the security policy applied to the information on the document can also be applied to the electronic data.

A second exemplary embodiment of the present invention is realized by a configuration similar to the system illustrated in FIG. 1.

The second exemplary embodiment differs from the first exemplary embodiment in processing performed when a selection of the "send mode" by the user is received. Accordingly, descriptions will be made only about those points that replace those FIG. 4, with reference to FIG. 5.

Figure 5:
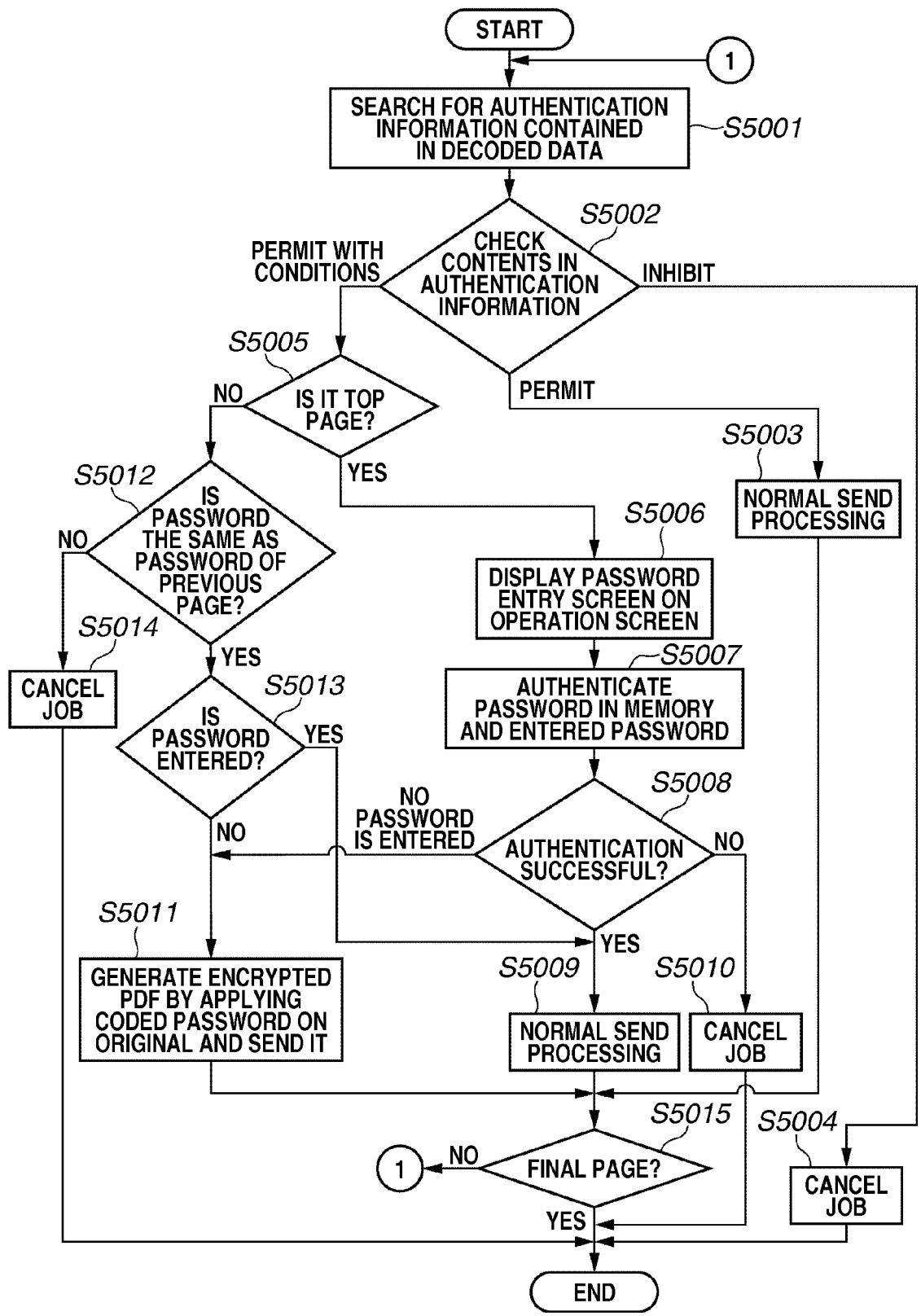
FIG. 5 illustrates a flowchart of an example of processing according to a second exemplary embodiment of the present invention.

In step S2005 in FIG. 2, if the MFP determines that the selection of the "send mode" has been received (SEND MODE in steps S2005), the processing proceeds to step S2006. The processing performed by the MFP in step S2006 in this embodiment is illustrated in FIG. 5.

In step S5001, the MFP determines whether the information stored in the memory in step S2004 contains authentication information for operation restriction. In the description, the authentication information for operation restriction is described with three examples of "permit", "inhibit", and "permit with condition by a password entry". However, in the authentication information for operation restriction, information other than the three examples of "permit", "inhibit", and "permit with condition by a password entry" may also be contained.

In step S5002, if the MFP determines the authentication information as "permit" (PERMIT in step S5002), the processing proceeds to step S5003.

In step S5003, the MFP performs normal send processing. Processing then advances to step S5015.

In step S5002, if the MFP determines the authentication information as "inhibit", the processing proceeds to step S5004.

In step S5004, the MFP cancels the job, and processing is ended.

In step S5002, if the MFP determines the authentication information as "permit with condition by a password entry" (PERMIT WITH CONDITIONS in step S5002), the processing proceeds to step S5005.

In step S5005, the MFP determines whether it is a top page of the job. In step S5005, if the MFP determines that it is a top page of the job (YES in step S5005), the processing proceeds to step S5006.

In step S5006, the MFP displays a password entry request screen on the operation screen to prompt the user to enter a password.

Then, in step S5006, the processing illustrated in FIG. 7 is implemented. More specifically, in step S7001, the MFP determines whether an entry of a password is detected.

In step S7001, if the entry of the password is not detected (NO in step S7001), in step S7002, the MFP cancels the job.

On the other hand, in step S7001, if the entry of the password is detected (YES in step S7001), the processing proceeds to step S5007.

In step S5007, the MFP performs an authentication by comparing the password information stored in the memory in step S2004 with the password entered in step S5006. The password may be used as a condition to permit printing of the original image.

In step S5008, if the MFP determines that the authentication is successful (YES in step S5008), the processing proceeds to step S5009.

In step S5009, the MFP performs normal send processing. In step S5009, the processing described in the first exemplary embodiment is not performed. That is, the processing in which the MFP generates an encrypted PDF of the bit-mapped original image that was stored in the memory in step S2004, using the password also stored in the memory, is not performed.

In step S5008, if the MFP determines that the authentication is not successful (NO in step S5008), the processing proceeds to step S5010.

In step S5010, the MFP cancels the job, and processing is ended.

In step S5005, if the MFP determines that it is not a top page (NO in step S5005), the processing proceeds to step S5012.

In step S5012, the MFP determines whether the password stored in the memory in step S2004 is the same as a password of a previous page of the job. In step S5012, if the MFP determines that the passwords are the same (YES in step S5012), the processing proceeds to step S5013.

In step S5013, the MFP determines whether a password entry by the user is detected.

In step S5013, if the MFP determines that the password entry is detected (YES in step S5013), the processing proceeds to step S5009 and the MFP performs normal send processing. Processing then advances to step S5015.

In step S5013, if the MFP determines that the password entry is not detected (NO in step S5013), the processing proceeds to step S5011. In step S5011, the MFP generates an encrypted PDF of the bit-mapped original image that was stored in the memory in step S2004, using the password also stored in the memory and sends the encrypted PDF to a destination device set in the "send mode". Processing then advances to step S5015.

In step S5012, if the MFP determines that the password is not the same as the password of the previous page of the job (NO in step S5012), the processing proceeds to step S5014.

In step S5014, the MFP cancels the job, and processing is ended.

Then, the MFP repeats the processing from steps S5001 to S5014 until all pages in the job are processed. More specifically, in step S5015, the MFP determines whether it is processing a final page. Then, in step S5015, if the MFP determines that it is not processing of the final page (NO in step S5015), the processing returns to step S5001. On the other hand, if the MFP determines that it is the processing of the final page (YES in step S5015), processing ends.

In the case where the MFP scans a document having embedded authentication information, generates electronic data, and sends the electronic data to a file server or a PC, by performing the above-described processing, control described below can be performed.

A user once authenticated by the MFP to access a document may not be required to enter the password again. Accordingly, the convenience of the user can be increased. This may be effective when the user operating the MFP sends a document to a user's PC as a destination using the send function of the MFP. Whether the user operating the MFP is the same as the user of the destination address in the "send mode" can be determined using an available login function, which can be separately provided.

Further, even if a user operating the MFP does not know the authentication information of the document, the user can use the send function of the MFP. This may be effective when the user operating the MFP sends the document to a PC other than the user's PC as a destination using the send function of the MFP. Although the authentication control of the document is not performed in the MFP, an authentication control can be performed in the destination PC. Accordingly, the operability of the user can be increased while the security of the information of the document can be maintained.

In the above-described exemplary embodiments, the two-dimensional code has been employed. However, the present invention is not limited to that code, but instead a one-dimensional code, a digital watermark, a steganography, or the like, can also be employed.

Further, in the above exemplary embodiments, the memory has been used as a medium for storing data. However, the medium is not limited to the memory, but instead any medium can be employed if data can be stored (for example, any one or more of a hard disk drive (HDD) or a random access memory (RAM)) in place of the memory.

Further, in the above-described exemplary embodiments, it has been assumed that the MFP performs the scanning operation. However, in the present descriptions, the scanning refers to optically reading an image on a document. Thus, for example, the exemplary embodiments of the present invention can also be realized by photographing with a digital camera.

Further, in the above-described exemplary embodiments, the MFP can perform all of reading an image, processing information, and printing an image on a sheet. However, devices that can perform one or more of reading an image, processing information, and printing an image on a sheet may also be individually provided.

In the present specification, the image processing apparatus can be an apparatus that can perform at least processing of information. Further, in the present specification, the image processing apparatus can also be an apparatus that can perform at least processing of information and printing of an image on a sheet.

Further, the aspects of the present invention can also be achieved by providing a storage medium that contains computer-executable instructions, such as by recording a program code, that implements one or more of the procedures described in the flowcharts according to the above-described exemplary embodiments, and by reading and executing the computer-executable instructions stored in the storage medium with a computer. In such a case, the storage medium itself, containing the computer-executable instructions that are read from the storage medium, implements the functions according to the exemplary embodiments mentioned above, and accordingly, the storage medium having the computer-executable instructions may comprise an embodiment in accordance with the present invention.

As the storage medium for supplying such computer-executable instructions, for example, at least one of a flexible disk, a hard disk, an optical disk, magneto-optical disk, a CD-ROM, a CD-R, a magnetic tape, a nonvolatile memory card, or a ROM can be used.

While the present invention has been described with reference to exemplary embodiments, it is to be understood that the invention is not limited to the exemplary embodiments disclosed herein. Rather, the scope of the following claims is to be accorded the broadest interpretation so as to encompass all modifications, equivalent structures, and functions.

This application claims priority from Japanese Patent Application 2008-015502 filed on Jan. 25, 2008, which is hereby incorporated by reference herein in its entirety.

What is claimed is:

1. An image processing apparatus comprising:
at least one processor configured to control:
a generation unit configured to scan a document to generate an original image;
a decoding unit configured to decode a two-dimensional code on the original image generated by the generation unit to obtain original information;
a determination unit configured to determine whether the original information obtained in the decoding unit contains information indicating a password;
an authentication information determination unit configured to determine whether the original information contains authentication information indicating whether input of the password is required to permit sending of an unencrypted electronic file generated from the original image;
a password receiving unit configured to receive a password input by a user; and
a conversion unit configured to
in a case where the determination unit determines that the original information contains the information indicating the password
convert the original image generated by the generation unit into an electronic file that is encrypted by applying the information indicating the password, if the authentication information determination unit determines that the authentication information requires input of the password to permit sending of the unencrypted electronic file, and no password is received by the password receiving unit,
convert the original image generated by the generation unit into an electronic file without encrypting by applying the information indicating the password, if the authentication information determination unit determines that the authentication information requires input of the password to permit sending of the unencrypted electronic file, and the password is received by the password receiving unit, and
convert the original image generated by the generation unit into an electronic file without encrypting by applying the information indicating the password, if the authentication information determination unit determines that the authentication information does not require input of the password to permit sending of the unencrypted electronic file, and
in a case where the determination unit determines that the original information does not contain the information indicating the password
convert the original image generated by the generation unit into an electronic file without encrypting by applying the information indicating a password; and
a sending unit configured to send the electronic file obtained by the conversion in the conversion unit.

2. An image processing method comprising:
using a processor to perform the following:
scanning a document to generate an original image;
decoding a two-dimensional code on the generated original image generated by the generation unit to obtain original information;
determining whether the obtained original information contains information indicating a password;
determining whether the original information contains authentication information indicating whether input of the password is required to permit sending of an unencrypted electronic file generated from the original image;
in a case where it is determined that the original information contains the information indicating the password
converting the generated original image into an electronic file that is encrypted by applying the information indicating the password, if it is determined that the authentication information requires input of the password to permit sending of the unencrypted electronic file, and no password is received from a user;

converting the original image into an electronic file without encrypting by applying the information indicating the password, if it is determined that the authentication information requires input of the password to permit sending of the unencrypted electronic file, and the password is received from the user, and converting the original image into an electronic file without encrypting by applying the information indicating the password, if it is determined that the authentication information does not require input of the password to permit sending of the unencrypted electronic file, and in a case where it is determined that the original information does not contain the information indicating the password converting the generated original image into an electronic file without encrypting by applying the information indicating a password; and sending the obtained electronic file.

3. A non-transitory computer-readable storage medium containing computer-executable instructions for executing image processing, the computer-readable storage medium comprising:

computer-executable instructions for scanning a document to generate an original image;

computer-executable instructions for decoding a two-dimensional code on the generated original image generated by the generation unit to obtain original information;

computer-executable instructions for determining whether the obtained original information contains information indicating a password;

computer-executable instructions for determining whether the original information contains authentication information indicating whether input of the password is required to permit sending of an unencrypted electronic file generated from the original image;

computer-executable instructions for in a case where it is determined that the original information contains the information indicating the password converting the generated original image into an electronic file that is encrypted by applying the information indicating the password, if it is determined that the authentication information requires input of the password to permit sending of the unencrypted electronic file, and no password is received from a user;

converting the original image into an electronic file without encrypting by applying the information indicating the password, if it is determined that the authentication information requires input of the password to permit sending of the unencrypted electronic file, and the password is received from the user, and converting the original image into an electronic file without encrypting by applying the information indicating the password, if it is determined that the authentication information does not require input of the password to permit sending of the unencrypted electronic file, and in a case where it is determined that the original information does not contain the information indicating the password converting the generated original image into an electronic file without encrypting by applying the information indicating a password; and computer-executable instructions for sending the obtained electronic file.

* * * * *